United States Patent

Bénéteau

[11] Patent Number: 4,649,592
[45] Date of Patent: Mar. 17, 1987

[54] WIPER BLADE

[75] Inventor: Christian Bénéteau, Gorcy, France

[73] Assignee: Champion Spark Plug Europe, S.A., Binche, Belgium

[21] Appl. No.: 813,849

[22] Filed: Dec. 27, 1985

[30] Foreign Application Priority Data

Jan. 29, 1985 [FR] France .............................. 85 01196

[51] Int. Cl.$^4$ .............................................. B60S 1/38
[52] U.S. Cl. ................................................ 15/250.36
[58] Field of Search ...................... 15/250.36–250.42, 15/250.33

[56] References Cited

U.S. PATENT DOCUMENTS 2,657,415 11/1953 Rappl .
2,663,043 12/1953 Oishei .
2,701,382 2/1955 Oishei .
3,116,510 1/1964 Oishei et al. .
4,342,129 8/1982 Thompson .

FOREIGN PATENT DOCUMENTS 2223898 12/1972 Fed. Rep. of Germany .
2344876 3/1974 Fed. Rep. of Germany .
2324701 12/1974 Fed. Rep. of Germany .
2336271 2/1975 Fed. Rep. of Germany .
2500389 3/1981 France .
456189 11/1936 United Kingdom .
671521 5/1952 United Kingdom .
707559 4/1954 United Kingdom .
710360 6/1954 United Kingdom .
A2093339 9/1982 United Kingdom .

Primary Examiner—Peter Feldman
Attorney, Agent, or Firm—Wood, Dalton, Phillips, Mason & Rowe

[57] ABSTRACT

A wiper blade is provided and has a pressure distributing rod with a longitudinal groove having a substantially T-shaped form and a wiping element. The T-shaped form of the groove has a horizontal bar and a vertical bar. The wiping element has an upper portion located in the horizontal bar of said T, a medium portion partially located in the vertical bar of said T and a lower portion forming a wiping lip. The vertical bar of said T is tapered in a direction opposite to the surface to be wiped with the junction between the vertical bar and the horizontal bar of said T is defined by rounded curves. The upper portion of the wiping element is linked to the medium portion of the wiping element by a reduced portion which, in cross-section, is defined by rounded curves. The taper of the vertical bar of said T and the rounded curves between the horizontal and vertical bars nest in the rounded curves in the reduced portion of the wiping element whereby the wiping element is permitted to pivot about the rounded curves of the pressure distributing rod.

8 Claims, 9 Drawing Figures

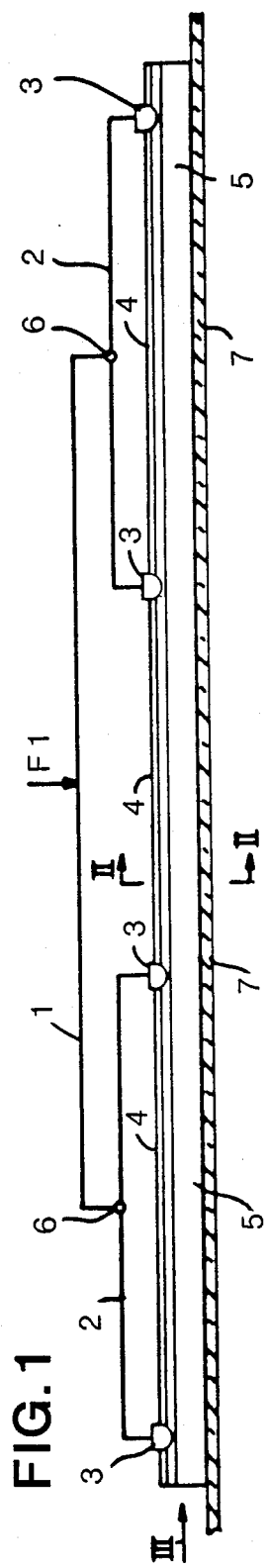
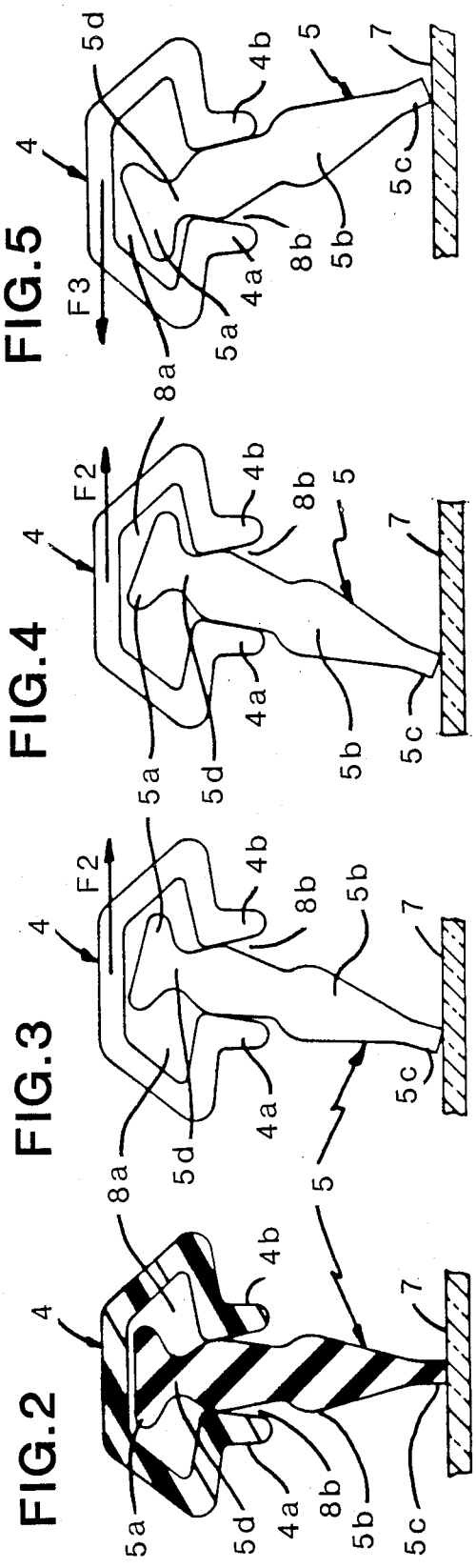

WIPER BLADE

TECHNICAL FIELD

This invention relates to wiper blades and in particular to wiper blades having a wiping element and a pressure distributing rod or flexor connected to said wiping element.

BACKGROUND OF THE INVENTION

Wiper blades are well known in the prior art. by way of example the wiper blades, and in particular the pressure distributing rods and the corresponding wiping elements, disclosed in the following documents may be mentioned: the German (DE) patent application Nos. 2,223,898—2,324,701—2,344,876 and the French patent application No. 2,500,389.

The wiping element disclosed in said four patent documents have at least two common characteristics:

The wiping element comprises, in cross-section, a neck portion which acts as a hinge about the axis of which the lower portion of the wiping element may rock in order to follow the oscillating movement of the wiper arm of the wiper blade.

The lower portion of the wiping element comprises, in cross-section, a triangular portion of which one of the sides is directed towards the pressure distributing rod and of which the edge opposite to said side is directed towards the surface to be wiped.

The main disadvantages of the wiping element provided with a neck portion acting as a hinge are: (a) a considerable force is needed for obtaining the rocking movement of the lower portion of the wiping element, (b) in bad weather conditions the rocking movement of the lower portion of the wiping element risks to be irregular and (c) the neck or hinge portion is subject to the aging phenomenon, i.e. to becoming brittle with time, and thus have negative effects on the good functioning of the wiper blade.

Concerning the triangular portion of the lower portion of the wiping elements disclosed in the above mentioned patent documents it is to be noted that its function is to limit the rocking movement of said lower portion of the wiping elements in alternatively touching on both sides the bottom surface of the pressure distributing rods, as a function of the oscillating movement of the wiper arm of the wiper blade.

Another disadvantage of the known wiping elements is not only their relatively important volume, but also the fact that in cross-section they show width variations and thus volume variations which are very important and which create problems difficult to be solved when the wiping elements are to be extruded in a continuous manner. Indeed the dimensional tolerances are much easier to be met with when the cross-section of the wiping element shows only small width variations.

As a last disadvantage, not only of the known wiping elements, but also of the known pressure distributing rods, their weak performance when the vehicle moves at high speed can be mentioned. In these circumstances said two elements are subject to a strong air current which flows along the windshield of the vehicle and which tends to lift the wiper blade, the result being first a bad wiping efficiency and then no wiping effect at all. The action of the air flow at high speed is a very complex phenomenon, i.e. said action depends on numerous parameters. One of these parameters is the presence, on the wiping element and/or on the pressure distributing rod, of large surfaces which are substantially parallel to the surface to be wiped.

SUMMARY OF THE INVENTION

The present invention relates to a wiper blade comprising a pressure distributing rod provided with a longitudinal groove having a substantially T-shaped form and a wiping element comprising an upper portion located in the horizontal bar of said T, a medium portion partially located in the vertical bar of said T and a lower portion forming a wiping lip. Such wiper blades are used in particular on motor vehicles.

The object of the invention is to provide a wiper blade which eliminates as much as possible the above mentioned disadvantages of the known wiper blades, i.e.:

to provide a wiper blade of which the wiping element does no longer comprise a hinge portion;
to provide a wiper blade wherein the total volume of the wiping element is reduced to a minimum;
to provide a wiper blade of which the wiping element can be easily extruded in a continuous manner; and
to provide a wiper blade of which the configuration of the wiping element and of the pressure distributing rod guarantee a better wiping efficiency when the vehicle moves at high speed.

To this effect the wiper blade according to the invention is substantially characterized by the fact that:

(a) the vertical bar of said T is tapered in the direction opposite to the surface to be wiped,
(b) the junction between the vertical and the horizontal bar of said T is realized by rounded curves, and
(c) the upper portion of the wiping element is linked to the medium portion of the wiping element via a reduced portion which, in cross-section, is laterally limited by rounded curves.

According to a first embodiment of the invention the wiper blade is further characterized by the fact that in cross-section the medium portion of the wiping element is laterally limited by undulated curves and according to a second embodiment of the invention the wiper blade is characterized by the fact that in cross-section the medium portion of the wiping element is laterally limited over most of its height by straight lines.

Other characteristics of the wiper blade according to the invention will be better understood when reading the following description of four embodiments of the invention, in conjunction with the appended drawings wherein:

IN THE DRAWINGS

FIG. 1 is a schematic elevational view of a wiper blade according to the invention;

FIG. 2 is a section, at a larger scale and along line II—II of certain elements of the wiper blade of FIG. 1 and according to the first embodiment of the invention;

FIG. 3 is a view, at a larger scale and along arrow III of certain elements of the wiper blade of FIG. 1 and according to the first embodiment of the invention;

FIGS. 4 and 5 are views similar to the one of FIG. 3, one of the represented elements being each time in a different position;

THE PREFERRED EMBODIMENTS OF THE INVENTION

Figure 6:
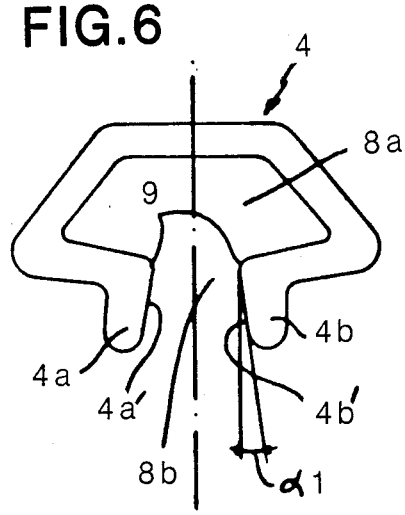
FIG. 6 is a view, at a somewhat larger scale, of one of the elements of FIGS. 2 through 5.

The wiper blade represented schematically and by way of example in FIG. 1 substantially comprises: the links 1 and 2, the claws 3, the pressure distributing rod 4 and the wiping element 5. The links 2 are connected to the link 1 via the articulations 6. The claws 3 secure the pressure distributing rod 4 to the links 2 and the wiping element 5 is linked to the claws 3 via the pressure distributing rod 4. The wiper arm (not shown) of the wiper blade acts with a force F1 on the link 1, substantially in its medium portion, so that the wiping element 5 is pushed towards the surface to be wiped 7.

FIG. 2 shows a section of the pressure distributing rod 4 and the wiping element 5 of the wiper blade of FIG. 1 when the wiper blade is in its rest position, position wherein the wiping element 5 is perpendicular to the surface to be wiped 7. As already said above, FIG. 2 (as well as FIGS. 3, 4, 5) shows the first embodiment of the invention.

In cross-section the configuration of the pressure distributing rod 4 is such that it comprises a longitudinal, substantially T-shaped groove, the reference numeral of the horizontal bar of said T being 8a and the reference numeral of the vertical bar of said same T being 8b. In FIGS. 2, 3, 4, 5 and more particularly in FIG. 6 it can be seen that the bar 8b of said T is tapered in the direction opposite to the surface to be wiped 7 (lines 4a', 4b' of the portions 4a, 4b of the pressure distributing rod 4) and that the junction between the vertical bar 8b and the horizontal bar 8a of the T is realized by the rounded curves 9.

The wiping element 5 (FIGS. 2, 3, 4, 5) comprises an upper portion 5a, a medium portion 5b and a lower portion 5c which forms the properly so called wiping lip and which is in contact with the surface to be wiped 7. The upper portion 5a of the wiping element 5 is completely located inside the horizontal bar 8a of the T-shaped groove of the pressure distributing rod 4, whereas the medium portion 5b of the wiping element 5 is partially located in the vertical bar 8b of the T-shaped groove of the pressure distributing rod 4. When the wiping element 5 is mounted onto the pressure distributing rod 4, it is pushed into the longitudinal groove 8a, 8b of the pressure distributing rod in the direction of the arrow III of FIG. 1.

The upper portion 5a of the wiping element 5 has a width which is slightly larger than the width of the other portions of this element, but also slightly larger than the distance between the two curves 9 (FIG. 6), curves 9 which realize the junction between the bars 8a, 8b of said T. The wiping element 5 thus cannot fall out of the groove 8a, 8b of the pressure distributing rod 4 when the wiper blade is lifted away from the surface to be wiped.

In FIGS. 2, 3, 4, 5 it can be seen that:
the upper portion 5a of the wiping element 5 is linked to the medium portion 5b of the wiping element via a reduced portion 5d which is laterally limited by rounded curves,
the medium portion 5b of the wiping element 5 is laterally limited by undulated curves, and
the width of the lower portion 5c of the wiping element 5 is smaller than the average width of the other portions of this element.

The way the thus described wiping element 5 works with respect to the pressure distributing rod 4 is shown in FIGS. 2, 3, 4, 5. When the wiper blade 5 rests on the surface to be wiped 7 the wiping element 5 is in the position shown in FIG. 2. When the wiper arm (not shown) acts with a force F2 on the wiper blade, said blade and consequently the pressure distributing rod 4 start to move along the surface to be wiped 7 and the wiping element 5 passes rapidly from the rest position of FIG. 2 to the wiping position of FIG. 4 in passing through the intermediate position of FIG. 3. When the wiper blade reaches its stop position (in one direction) the wiping element 5 is thus in the position shown in FIG. 4.

For starting the return movement (in the other direction) of the wiper blade the wiper arm acts with a force F3 on said blade and the wiping element passes rapidly from the position of FIG. 4 to the wiping position of FIG. 5 in passing through the intermediate positions of FIG. 3 and FIG. 2.

When the wiper blade is working, the wiping element 5 thus executes an oscillating movement as a function of the oscillating movement of the wiper arm. This movement does not imply an alternative bending of any portion of the wiping element 5 (except for the lower portion 5c, i.e. the properly so called wiping lip) as it is the case for the wiping elements of prior art. Indeed the undulated lateral surfaces of the portion reduced 5d and of the medium portion 5b roll in fact on the rounded surfaces 9 (FIG. 6) of the pressure distributing rod 4 and this oscillating movement is laterally limited by the surfaces 4a', 4b' (FIG. 6) of said same pressure distributing rod.

Figure 7:
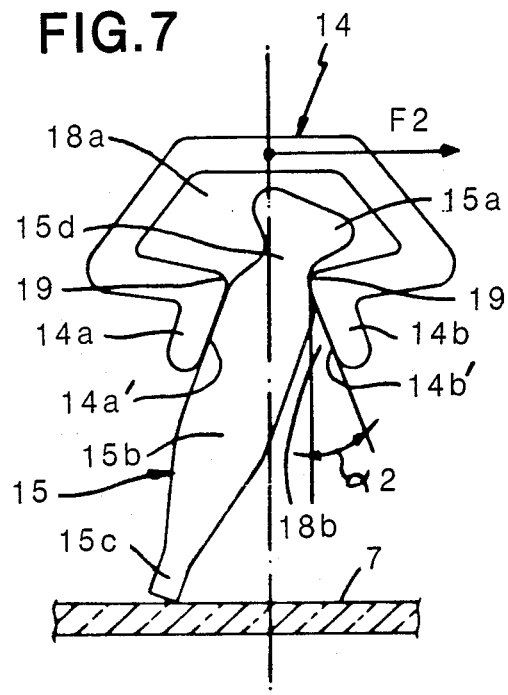
FIG. 7 is a view similar to that of FIG. 4, at a somewhat larger scale and according to the second embodiment of the invention.

FIG. 7 shows the second embodiment of the invention. The pressure distributing rod 14 is similar to the one of the first embodiment and it comprises a longitudinal T-shaped groove 18a, 18b of which the vertical bar 18b is tapered (portions 14a, 14b and surfaces 14a', 14b') in the direction opposite to the surface to be wiped 7. Just as in the first embodiment the junction between the vertical bar 18b and the horizontal bar 18a is realized by the rounded curves 19.

The wiping element 15 comprises an upper portion 15a, a medium portion 15b and a lower portion 15c. Just as in the first embodiment the upper portion 15a is linked to the medium portion 15b via a reduced portion 15d which, in cross-section, is laterally limited by rounded curves. In this second embodiment of the invention, the medium portion 15b is not laterally limited by undulated curves, but by straight lines which extend over most of its height.

The second embodiment works in exactly the same manner as the first embodiment. However, in order to obtain the same amplitude of oscillation of the wiping element 15 as the one shown in FIGS. 2, 3, 4, 5, the angle 2 (FIG. 7) is superior to the angle 1 (FIG. 6). This larger angle is necessary because the medium portion 15b of FIG. 7 is not laterally limited by undulated curves, but by straight lines.

Figure 8:
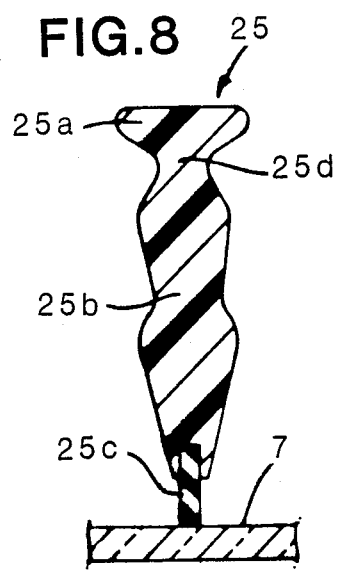
FIG. 8 is a section of the wiping element of the wiper blade according to the third embodiment of the invention.

FIG. 8 shows the wiping element 25 according to the third embodiment of the invention. The element 25 is substantially the same as the wiping element 5 of FIGS. 2, 3, 4, 5, except for its lower portion 25c. It comprises an upper portion 25a, a reduced portion 25d and a medium portion 25b. The lower portion 25c, i.e. the properly so called wiping lip consists of a separate part which is secured (for example glued) in a longitudinal groove provided in the medium portion 25b of the wiping element.

Figure 9:
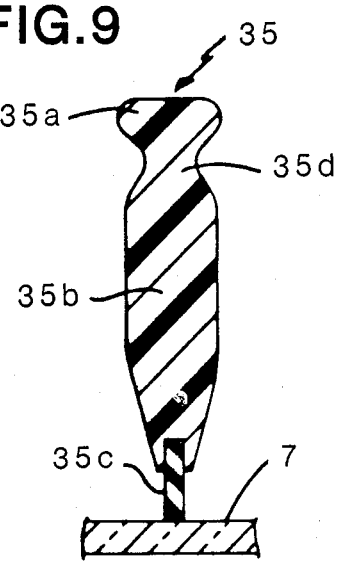
FIG. 9 is a section of the wiping element of the wiper blade according to the fourth embodiment of the invention.

FIG. 9 shows the wiping element 35 according to the fourth embodiment of the invention. The element 35 has substantially the same configuration as the one shown in FIG. 7, except for its lower portion 35c. It thus also comprises an upper portion 35a, a reduced portion 35d and a medium 35b. Just as in the third embodiment (FIG. 8) the wiping lip 35c is secured in a longitudinal groove provided in the medium portion 35b of the wiping element.

In all embodiments of the invention, the pressure distributing rod 4, 14 is preferably made of an appropriate plastic material. The wiping element of FIG. 2 through FIG. 7 is preferably made of an appropriate elastomer, whereas the upper portions 25a, 35a and the medium portions 25b, 35b of the embodiments of FIG. 8 and FIG. 9 are preferably made of an appropriate plastic material, the elastomer being used only for the wiping lips 25c, 35c.

Four embodiments of an improved wiper blade have thus been described. It is however evident that the invention is not limited to these four embodiments. Indeed modifications may be made without departing from the scope of the invention such as defined in the appended claims.

I claim:

1. A wiper blade comprising a pressure distributing rod (4, 14) provided with a longitudinal groove having a substantially T-shaped form (8a, 8b; 18a, 18b) and a wiping element (5, 15, 25, 35) comprising an upper portion (5a, 15a, 25a, 35a) located in the horizontal bar (8a, 18a) of said T, a medium portion (5b, 15b, 25b, 35b) partially located in the vertical bar (8b, 18b) of said T and a lower portion (5c, 15c, 25c, 35c) forming a wiping lip, characterized in that:

(a) the vertical bar (8b, 18b) of said T is tapered in the direction opposite to the surface to be wiped, (b) the junction between the vertical (8b, 18b) and the horizontal (8a, 18a) bar of said T is realized by rounded curves (9, 19), (c) the upper portion (5a, 15a, 25a, 35a) of the wiping element (5, 15, 25, 35) is linked to the medium portion (5b, 15b, 25b, 35b) of the wiping element via a reduced portion (5d, 15d, 25d, 35d) which, in cross-section, is laterally limited by rounded curves, and (d) at least a portion (5a, 15a, 25a, 35a) of said wiping element (5, 15, 25, 35) is loosely nested within the pressure distributing rod (4, 14) whereby said wiping element is allowed to oscillate with respect to said pressure distributing rod.

2. A wiper blade according to claim 1, characterized in that in cross-section the medium portion (5b, 25b) of the wiping element (5, 25) is laterally limited by undulated curves.

3. A wiper blade according to claim 1, characterized in that in cross-section the medium portion (15b, 35b) of the wiping element (15, 35) is laterally limited over most of its height by straight lines.

4. A wiper blade according to claim 1, characterized in that in cross-section the width of the lower portion (5c, 15c, 25c, 35c) of the wiping element (5, 15, 25, 35) is smaller than the average width of the other portions of the wiping element (5, 15, 25, 35).

5. A wiper blade according to claim 1, characterized in that the pressure distributing rod (4, 14) is made of an appropriate plastic material.

6. A wiper blade according to claim 1, characterized in that the wiping element (5, 15) is made of an appropriate elastomer.

7. A wiper blade according to claim 1, characterized in that the wiping element (25, 35) is made of two parts, the first part corresponding to the upper portion (25a, 35a) and to the medium portion (25b, 35b) of said wiping element (25, 35) and the second part corresponding to the lower portion (25c, 35c) of said wiping element (25, 35).

8. A wiper blade according to claim 7, characterized in that said first part of the wiping element (25, 35) is made of an appropriate plastic material and that said second part of the wiping element (25c, 35c) is made of an appropriate elastomer.

* * * * *